Oct. 11, 1960 P. E. ZIEGLER 2,955,776
AIRCRAFT WITH INTEGRAL ANTENNA
Filed Oct. 24, 1958 3 Sheets-Sheet 1
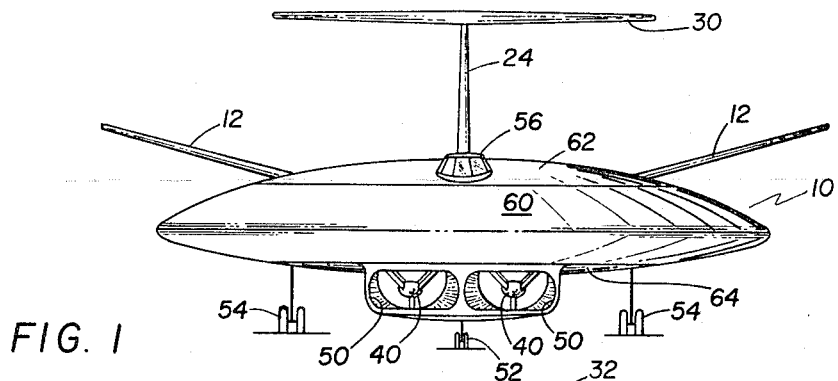
FIG. 1
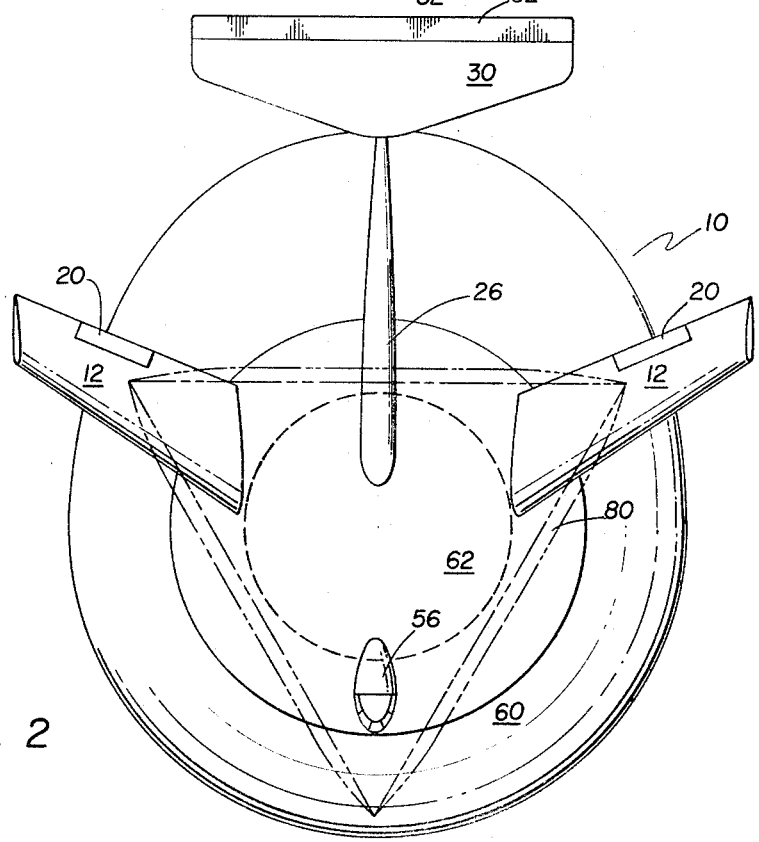
FIG. 2
FIG. 6
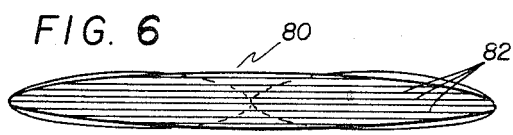
INVENTOR.
PAUL E. ZIEGLER
BY Duane C. Bowen Oct. 11, 1960 P. E. ZIEGLER 2,955,776
AIRCRAFT WITH INTEGRAL ANTENNA
Filed Oct. 24, 1958 3 Sheets-Sheet 3

INVENTOR.
PAUL E. ZIEGLER
BY Duane C. Bowen

United States Patent Office 2,955,776
Patented Oct. 11, 1960

2,955,776

AIRCRAFT WITH INTEGRAL ANTENNA

Paul E. Ziegler, Wichita, Kans., assignor to Boeing Airplane Company, Wichita, Kans., a corporation of Delaware Filed Oct. 24, 1958, Ser. No. 769,349

10 Claims. (Cl. 244—13)

My invention relates to an improved aircraft housing large antenna means in its fuselage. The radome for the antenna forms a major portion of the aircraft fuselage, and the aircraft has a generally disc-shaped fuselage configuration.

For air search from an aircraft using radar or other radiant energy propagation or detection means, the range is increased and the resolution is improved partly as a function of the size of the antenna, e.g., the length of the radiating wave guide elements. It is desirable that the swept volume of the radar or the like is 360° in azimuth and approximately 15° in elevation. These features may be best achieved by using a large disc-shaped radome free from obstruction of metallic structure about the radome perimeter. Following these considerations, several aircraft have been constructed supporting above the fuselage a large disc-shaped radome. However, the size of radome that can be thus carried is limited.

An object of my invention is to provide a maximum sized disc-shaped radome in an air search aircraft by forming the major part of the fuselage as a radome. Another object of my invention is to provide in such an installation substantially 360° of the perimeter of the radome free from radio-opaque structure.

Further objects of my invention include to improve radar range and resolution in an air search aircraft by providing an aircraft design adaptable for the use of an antenna with longer radiating wave guide elements; to provide a large fuel, weapons, and cargo capacity; to provide maximum endurance for such aircraft; to solve the various problems caused by the disc-shaped configuration, such as difficult aerodynamic characteristics; and to provide a structure adapted for the use of a rotatable or a fixed antenna.

My invention will be best understood, with additional objectives and advantages thereof, from the following description, read with reference to the drawings, in which:

Figure 1 is a front elevational view of a specific embodiment of my new aircraft;

Figure 2 is a plan view of the aircraft;

Figure 3 is a side view of the aircraft;

Figure 4 is a view of the aircraft similar to that of Figure 1 but on enlarged scale, partly in section, and with wing and tail portions omitted;

Figure 5 is an enlarged fragmentary elevational view of portions of the rotatable antenna, antenna support, and central hub;

Figure 6 is an elevational view of the antenna;

Figure 7:
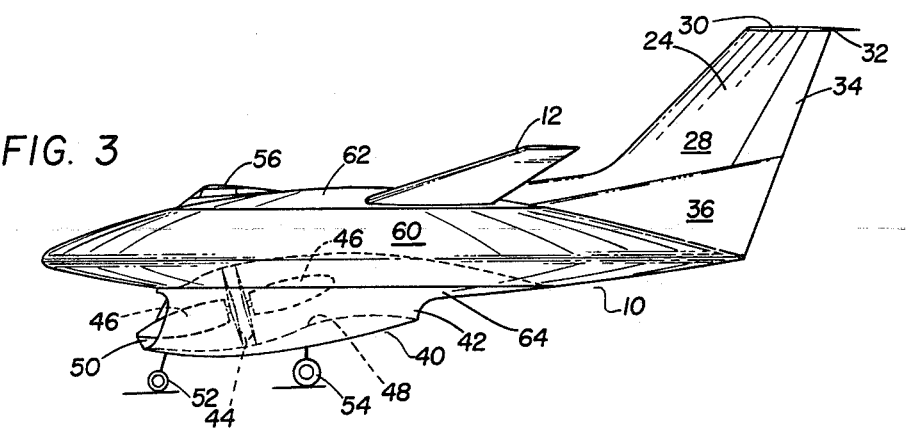
Figure 7 is a plan view of the aircraft fuselage showing a modified radar installation in which the antenna is fixed.

Fuselage 10 has a generally disc-shaped outline with convex upper and lower surfaces. A generally disc-shaped body is used to achieve the objective of maximizing the length of antenna radiating wave guide elements, as 82. The antenna may be fixed or rotating and is to sweep 360° in azimuth. A fuselage of this configuration creates a number of problems in the aircraft design. The use of an unsymmetrical disc shape alleviates some of these problems, and fuselage 10 is not circular when viewed from the top and is not symmetrical when viewed from the side. The large size of the fuselage requires that considerable lift must be generated by the fuselage. The fuselage preferably provides the major portion of the lift of the aircraft. Referring to Figure 3, the outline of the fuselage in side view has an airfoil outline and hence usbstantial lift will be created thereby. The broad and short fuselage is a relatively unstable configuration and a modified NACA–66 airfoil is preferred because of the stability of this airfoil. The general fuselage shape is generated by rotating the forward half of the NACA–66 airfoil outline to each side and then fairing the rear portion of the fuselage into the partial configuration thus defined. Viewed from above, the fuselage outline is ovate with the larger end forward.

The diameter of fuselage 10 depends on various factors and a specific example is approximately 100 feet resulting in antenna radiating wave guide element lengths of about 80 feet. This is not a maximum and a much larger diameter fuselage can be used. One factor in deciding the dimensions is the length of antenna desired and, in general, the longer the antenna radiating wave guide elements the better range and resolution. Another factor is the endurance of the aircraft, e.g., the time the aircraft may remain in the air with or without refueling in the air. For many air search applications the greater endurance the better. Another factor is cargo capacity, the cargo being usually weapons such as missiles to operate against detected objects. These weapons may be primary or secondary to the aircraft mission. The large dimensions of the antenna hub, used for transporting cargo, means that the missiles may be longer than most other aircraft can carry. Of course other factors include the cost of the aircraft, the type of power plants used, the weight and size of electronic components, etc.

The disc-shaped fuselage inherently has low aerodynamic efficiency and is relatively unstable. The fuselage 10 is relatively short considering the over-all aircraft size, weight, area of aerodynamic surfaces, etc. The problem of instability and the need to obtain adequate lift and control surfaces determine the type and configuration of tail and wings used. The wing and tail constructions shown in the drawing are exemplary and different configurations may be used on other particular aircraft of the type herein disclosed, as will be understood by those skilled in the art.

The wings 12 illustrated are swept and have about 15° dihedral. In addition to aerodynamic characteristics and the need for support from central structural members, an additional reason for adding dihedral to the wings is to avoid interference with the radar or other radiant energy means. Wings 12 have elevons 20 and may have other control surfaces not shown. Preferably a single tail 24 is provided and is supported from the fuselage by a structural boom portion 26. Tail 24 includes a vertical stabilizer portion 28, a horizontal stabilizer 30, elevators 32 and a rudder 34. A radio-translucent housing 36 is used to fill the space between the upper surface of fuselage 10 and the underside of structural boom 26 to avoid interference drag. The skin, structural ribs and the like of portion 36 may be formed of glass-fiber reinforced plastic. Horizontal stabilizer 30 is relatively high in the free air stream.

A pair of ducted-fan power plants 40 are shown in the drawings as a preferred power plant system. The ducted-fan engines 40 have high thrust but would not be used for additional thrust alone because of weight and drag penalties. The important characteristic of the ducted-fan is that the exhaust nozzle portion 42 can be downwardly and outwardly directed so that the line of thrust extends through the center of gravity of the aircraft and thereby the problem of trim is alleviated. Variations in power do not affect stability, needed to be corrected by trim, as long as the thrust acts through the center of gravity, and hence the instability of the aircraft configuration is alleviated. The ducted-fan is shown schematically, being of conventional detail, and includes, essentially, a pair of turboprop power plants having propellers 44 nose to nose and one turbine 46 forward and one turbine 46 aft. The propellers are housed in tunnels 48 and have inlet nozzles 50 on the forward, underside of the fuselage.

Tricycle landing gear are shown schematically including the nose gear 52 and the two side landing gear 54. The cockpit 56 is on the upper forward portion of fuselage 10. Other external and internal equipment will be provided but most details not important in disclosing the present design are not shown.

The medial, circumferential portion 60 of the fuselage has radome-type radio-translucent skins and supporting rib and other structurel members. These can be formed of glass-fiber reinforced plastics and the like. To obtain required strength, a sandwich skin construction is indicated. Radome 60 forms the complete perimetrical portion of the fuselage and fairs into upper and lower disc-shaped metal skin and support portions 62, 64. The radome as shown is of a size and configuration relative the antenna so that 360° in azimuth and 15° in elevation may be swept. The metal skins on upper and lower portions 62, 64 are supported by suitable rib and other structural frame members which extend from a central, trussed, metal hub framework 66. Wings 12 and the boom portion 26 of tail 24 are secured to this central framework.

Figure 8:
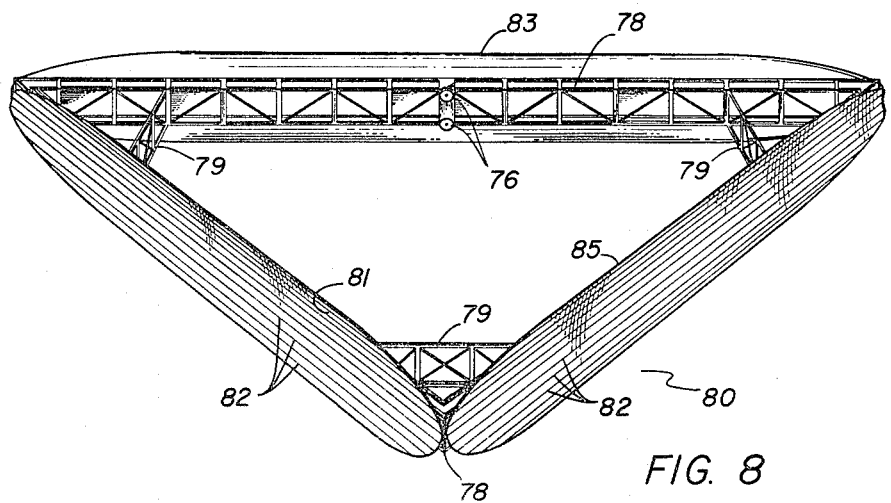
Figure 8 is a perspective view of the antenna shown in Figures 2, 5, and 6.

The showing of the structural support system and trussed hub 66 is essentially schematic. In Figure 5 the structure is somewhat more detailed. The edge portions of upper and lower disc-shaped sections 62, 64 are supported by a truss system 70. A pair of tracks 74 are supported on central hub 66 and rubber-tired wheels 76 of the rotatable antenna carriage 78 ride on tracks 74. The sections of carriage 78 are shown in Figure 8 to be built up in the manner of a truss and to have bracing frameworks 79 across the corners. The rubber tires have shock-absorbing and electrical insulation functions.

The rotatable antenna 80 has an equilateral triangle configuration, as shown by dotted lines in Figure 2. The sides have the maximum dimensions which are rotatable within fuselage 10 about the central fixed hub 66. As shown in Figures 6 and 8, each antenna section 81, 83, 85, is oblong and tapered to each end, the outline being determined partly by the configuration of the space in which the antenna rotates. The three antenna sections 81, 83, 85 are shown to be of parabolic dished type and are each formed by a dielectric sheet on which is mounted the radiating wave guide elements 82 that are shown to be a series of parallel rods in Figures 5, 6, and 8.

A fixed antenna can be triangular, circular or rectangular, and in Figure 7 a fixed antenna installation is shown in which there are four antenna sections 90 forming a square and each section being similar in form to that shown in Figure 6. The four antenna sections 90 are fixed to a central hub 92 and the length of the antenna sections are about the maximum for the general shape of the fuselage 94, which is similar to that shown in Figures 1–6.

In Figure 4 the outline 100 is traced by the antenna as it is rotated and fuselage 10 is generally concentric with this outline. With a square or triangular fixed antenna, the shape of the fuselage would not have to be disc-shaped but the use of a fuselage of about equal width and length would lead to the use of a disc-shaped body for its aerodynamic characteristics.

The space within hubs 66, 92 may contain fuel tanks, personnel compartments, electronic gear and weapons. The larger diameter of the space would permit the transporting of missiles of substantial length.

For convenience of expression in the claims, the expression "radiant energy means" is used as being inclusive of radar and other forms of radiation, such as infrared, and as being inclusive of passive and purely detecting systems as well as active, ranging and detecting propagating systems. The word "radome" is used as being inclusive of antenna coverings, translucent to the radiant energy for which it is designed, for other types of radiant energy means besides radar.

Having thus specifically described my invention, I do not wish to be understood as limiting myself to the precise details of construction shown, but instead wish to cover those modifications thereof that will occur to those skilled in the art from my disclosure and that fairly fall within the scope of my invention, as described in the following claims.

I claim:

1. An aircraft, comprising: a generally disc-shaped fuselage having in uppermost and lowermost sections central, convex, disc-shaped metal skins and having medially of said uppermost and lowermost sections an annular skin circumferential of said fuselage formed of non-metallic material and forming a radome extending between and fairing into said metal skins, a central metal hub structure extending between and supporting said metal skins, and radiant energy antenna means mounted about said central hub structure and operating through said radome, said radome being translucent to the radiant energy.

2. The subject matter of claim 1 in which said antenna means is mounted to rotate about said hub thereby sweeping 360° in azimuth.

3. The subject matter of claim 1 in which said aircraft has metal wing and tail members and said antenna is shaped and directed to sweep substantially 360° in azimuth and to sweep in elevation substantially throughout the area of said radome and said metal wing and tail members and other radio-opaque structure of said aircraft are located outside of the volume swept by said antenna.

4. The subject matter of claim 1 in which said fuselage is shaped in the direction of the free air stream so that the airstream will create a larger total pressure on lower than on upper fuselage surfaces so that lift is produced and in which there are wing members extending laterally from said hub structure and in which there are horizontal and vertical stabilizer tail members cantilevered aft from said hub structure.

5. The subject matter of claim 1 in which said antenna has several sections arranged symmetrically about said central hub structure forming a closed figure in plan view of substantially the maximum size fitting in said radome.

6. The subject matter of claim 5 in which said antenna is stationary relative to said fuselage.

7. The subject matter of claim 5 in which said antenna is rotatable about said central hub structure and in which the antenna traces an outline similar to the medial portion of said fuselage and of substantially the largest size rotatable therein.

8. An aircraft, comprising: a fuselage having a flattened ovate general shape and said fuselage providing the major lifting surface of the aircraft, the medial skins and supporting framework of said fuselage forming the circumference of said ovate shape being of radio-translucent material forming a radome, the upper and lower skins and supporting framework of said fuselage above and below said medial portion being formed of normal, radio-opaque aircraft skin and frame materials and fairing into the medial skins, a central metal hub structure extending between and supporting said upper and lower skins and supporting framework, and radiant energy antenna means mounted about said central hub structure and operating through said radome.

9. The subject matter of claim 8 in which said aircraft has ducted fan power plant means having the thrust thereof disposed on a line passing approximately through the aircraft center of gravity.

10. An aircraft, comprising: a generally disc-shaped fuselage having in uppermost and lowermost sections central, disc-shaped skins and having medially of said uppermost and lowermost sections a skin extending at least part way around the circumference of said fuselage formed of nonmetallic material and forming a radome extending between said disc-shaped skins, and radiant energy antenna means mounted in said fuselage and operating through said radome, said radome being translucent to the radiant energy.

References Cited in the file of this patent
UNITED STATES PATENTS

| | | |
|---|---|---|
| 2,242,200 | Woods | May 13, 1941 |
| 2,368,663 | Kandoian | Feb. 6, 1945 |
| 2,617,934 | McMillan et al. | May 2, 1945 |